United States Patent
Cheng

(10) Patent No.: US 8,547,654 B2
(45) Date of Patent: Oct. 1, 2013

(54) LENS DEVICE

(75) Inventor: Wen-Chieh Cheng, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 0 days.

(21) Appl. No.: 13/205,500

(22) Filed: Aug. 8, 2011

(65) Prior Publication Data

US 2012/0182632 A1   Jul. 19, 2012

(30) Foreign Application Priority Data

Jan. 14, 2011   (TW) ............................... 100101373 A

(51) Int. Cl.
*G02B 7/02* (2006.01)
*G02B 15/14* (2006.01)

(52) U.S. Cl.
USPC ............................ 359/822; 359/700; 359/699

(58) Field of Classification Search
USPC .................................. 359/694–704, 811–830
See application file for complete search history.

(56) References Cited

U.S. PATENT DOCUMENTS

| | | | | |
|---|---|---|---|---|
| 6,567,222 B2 * | 5/2003 | Shirota | .......................... | 359/699 |
| 6,822,810 B2 * | 11/2004 | Ichino | .......................... | 359/696 |
| 7,532,413 B2 * | 5/2009 | Chen et al. | .................... | 359/700 |
| 8,243,379 B2 * | 8/2012 | Chen | .............................. | 359/825 |
| 8,314,997 B2 * | 11/2012 | Zou et al. | ...................... | 359/699 |
| 8,369,025 B2 * | 2/2013 | Suzuki | .......................... | 359/700 |
| 2002/0118468 A1 | 8/2002 | Shirota | | |
| 2003/0072089 A1 * | 4/2003 | Yasutomi | ...................... | 359/701 |
| 2004/0160683 A1 * | 8/2004 | Nomura et al. | ............... | 359/819 |
| 2004/0165280 A1 * | 8/2004 | Ichino | .......................... | 359/696 |
| 2007/0092246 A1 * | 4/2007 | Aoki et al. | .................... | 396/462 |

FOREIGN PATENT DOCUMENTS

| | | |
|---|---|---|
| CN | 1379259 A | 11/2002 |
| CN | 1542485 A | 11/2004 |
| CN | 1854789 A | 11/2006 |
| CN | 101900865 A | 12/2010 |
| TW | 201022756 | 6/2010 |

* cited by examiner

*Primary Examiner* — Mohammed Hasan

(74) *Attorney, Agent, or Firm* — Rabin & Berdo, P.C.

(57) ABSTRACT

A lens device includes a fixed lens, a rotatable lens barrel, and a base. The fixed lens includes at least one cam groove which has an opening portion. The rotatable lens barrel is sleeved within the fixed lens. The rotatable lens barrel includes at least one cam follower. The cam follower enters the cam groove through the opening portion and moves along the cam groove. The base is assembled to the fixed lens. The base includes at least one protruding structure. The protruding structure extends to the cam groove through the opening portion.

20 Claims, 6 Drawing Sheets

LENS DEVICE

CROSS-REFERENCE TO RELATED APPLICATIONS

The entire contents of Taiwan Patent Application No. 100101373, filed on Jan. 14, 2011, from which this application claims priority, are incorporated herein by reference.

BACKGROUND OF THE INVENTION

1. Field of the Invention

The present invention generally relates to a lens device, and more particularly to a lens device which is applied in a digital camera system.

2. Description of Related Art

With advances in technology, digital camera devices have become much more popular in digital products, such as digital cameras, digital video cameras, mobile phones, personal digital assistants (PDAs), and so on. A digital camera device typically includes a lens device and an image sensor. The image can be focused on the image sensor by the lens device, whereby optical signals are transformed/transferred by the image sensor to electric signals.

As digital products become smaller, so must the lens device for commensurately decreasing the volume of the lens device. However, forming the conventional lens device to have smaller volumes has become increasingly difficult. For example, the conventional lens device usually includes an additional mechanical stop which is used for limiting the enclosing position of the rotatable lens barrel so as to prevent the rotatable lens barrel from rotating excessively. The design mentioned above may have some shortcomings. The design may increase the volume of the conventional lens device, or the design may decrease the structure strength. Thus, the conventional lens device may not altogether be suitable for the smaller digital product.

For the reason that there are some disadvantages of the prior art as mentioned above, a need exists to propose a lens device so as to meet consumer needs.

SUMMARY OF THE INVENTION

Accordingly, the present invention has been made in order to meet such a need as described above, it being an object of the present invention to provide a lens device so as to meet consumer needs.

In order to achieve the above object, the present invention provides a lens device. The lens device includes a fixed lens, a rotatable lens barrel, and a base. The fixed lens includes at least one cam groove which has an opening portion. The rotatable lens barrel is sleeved within the fixed lens. The rotatable lens barrel includes at least one cam follower. The cam follower enters the cam groove through the opening portion, and moves along the cam groove. The base is assembled to the fixed lens. The base includes at least one protruding structure. The protruding structure extends to the cam groove through the opening portion.

By the lens device of the present invention, the cam follower of the rotatable lens barrel is capable of contacting the protruding structure of the base for limiting the enclosing position of the rotatable lens barrel. There is no need to dispose additional mechanical stop. Thus, the lens device of the present invention has advantages. For example, the structure of the lens device is simpler. The lens device has fewer components. The lens device is easy to assemble. And the lens device has lower cost.

DETAILED DESCRIPTION OF THE INVENTION

The detailed description of the present invention will be discussed in the following embodiments, which are not intended to limit the scope of the present invention, and can be adapted for other applications. While drawings are illustrated in detail, it is appreciated that the quantity of the disclosed components may be greater or less than that disclosed, except for instances expressly restricting the amount of the components.

The present invention generally relates to a lens device which can be widely applied in many kinds of digital camera systems, such as digital still cameras, digital video cameras, mobile information terminals, image inputting device, image outputting apparatus, mobile phones, personal digital assistants (PDAs), and so on.

Figure 1A:
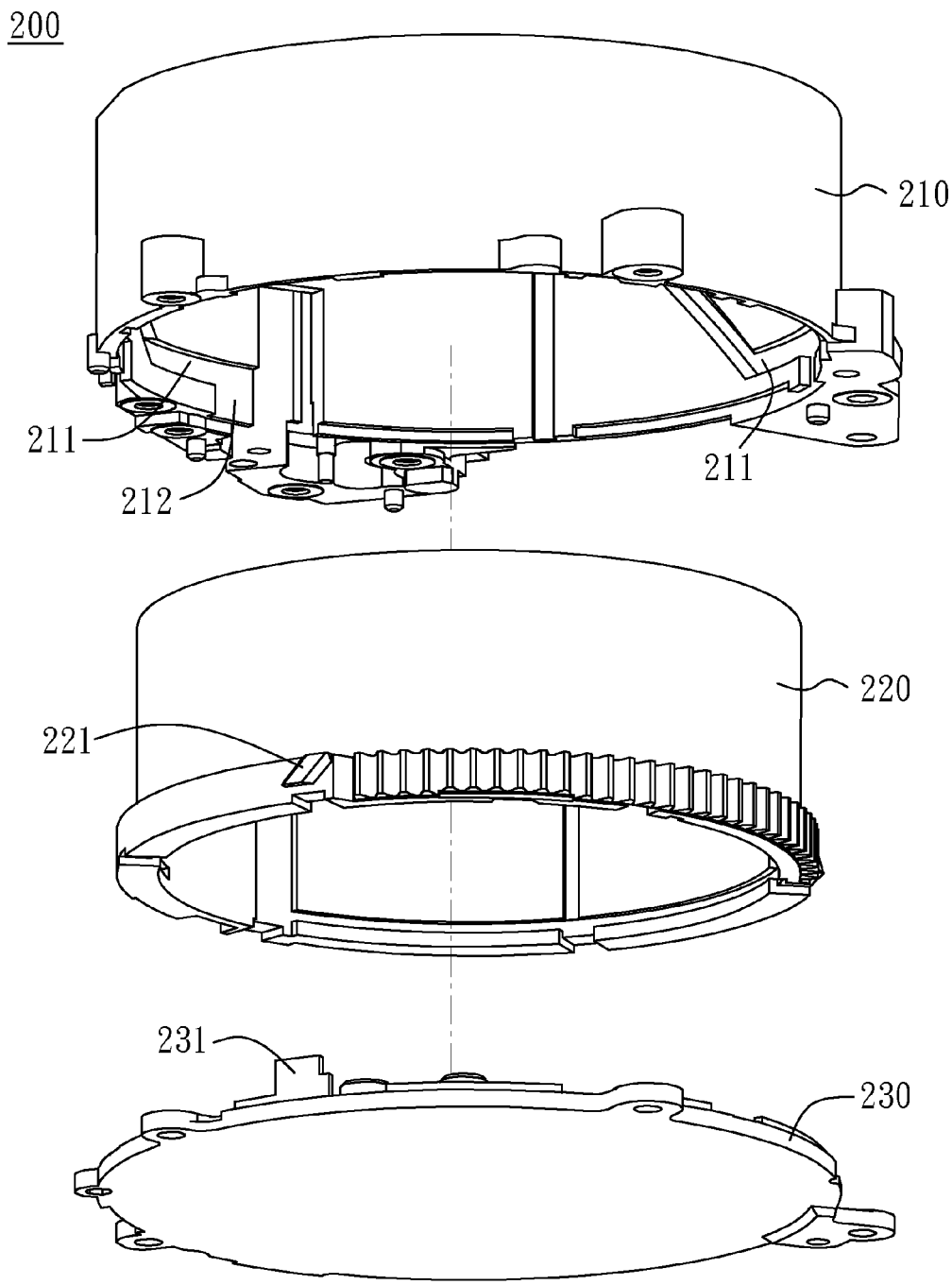
FIG. 1A shows the exploded perspective view of a lens device in accordance with an embodiment of the present invention.

FIG. 1A shows an exploded perspective view of a lens device 200 in accordance with an embodiment of the present invention. The lens device 200 includes a fixed lens 210, a rotatable lens barrel 220, and a base 230.

As shown in FIG. 1A, the rotatable lens barrel 220 is sleeved within the fixed lens 210, and the rotatable lens barrel 220 is able to move between an extending position and an enclosing position. The fixed lens 210 includes at least one cam groove 211; and the rotatable lens barrel 220 includes at least one cam follower 221. In this embodiment, the fixed lens 210 and the rotatable lens barrel 220 include a plurality of cam grooves 211 and a plurality of cam followers 221 respectively. These cam followers 221 move along these cam grooves 211 so as to control the position of the cam followers 221 during the extending process and the enclosing process. Moreover, in practice, these cam followers 221 are disposed on the rotatable lens barrel 220 uniformly for averaging the torsion force and the friction force during the extending process and the enclosing process. The rotatable lens barrel 220 is pushed uniformly. Thus, the rotatable lens barrel 220 is capable of performing linear motion and rotation steadily.

Figure 1B:
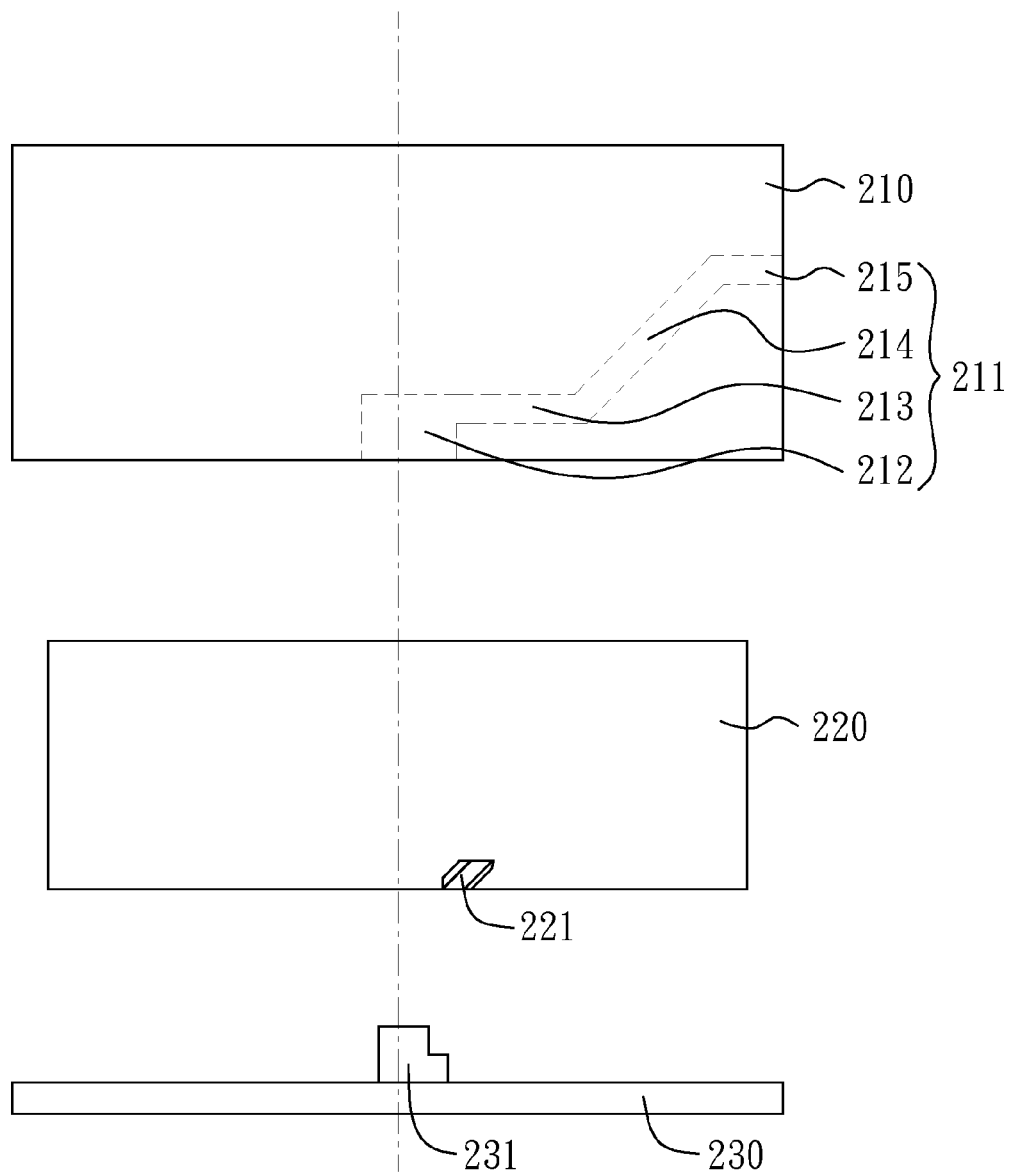
FIG. 1B shows the assembling method of the lens device shown in FIG. 1A.

FIG. 1B shows the assembling method of the lens device 200 shown in FIG. 1A. Referring to FIG. 1A and FIG. 1B, the base 230 is assembled to the fixed lens 210, and the base 230 includes at least one protruding structure 231. The protruding structure 231 extends to the cam groove 211. In this embodiment, the cam groove 211 has an opening portion 212. The assembling method of the lens device 200 includes the following steps. First, the rotatable lens barrel 220 is sleeved within the fixed lens 210. Then, the cam follower 221 is assembled to the cam groove 211 through the opening portion 212. Finally, the base 230 is assembled to the fixed lens 210. Meanwhile, the protruding structure 231 is disposed in the opening portion 212. The protruding structure 231 is extending to a position within the cam groove 211. In the position, the protruding structure 231 is capable of contacting the cam follower 221. When the cam follower 221 reaches the end position of the enclosing process, the cam follower 221 is capable of contacting the protruding structure 231 for making the rotatable lens barrel 220 stop. Moreover, the clearance between the protruding structure 231 and the opening portion 212 is corresponding to the protruding structure 231. Thus, the protruding structure 231 can seal the opening portion 212, and the cam follower 221 is prevented from escaping from the cam groove 211 through the opening portion 212.

Figure 1C:
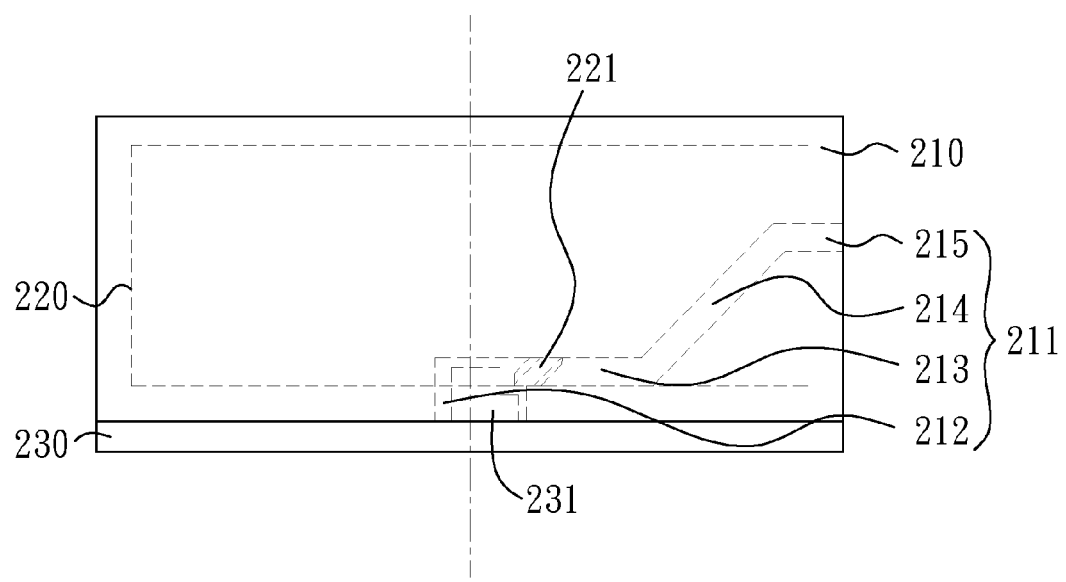
FIG. 1C shows the rotatable lens barrel at the enclosing position.
Figure 1D:
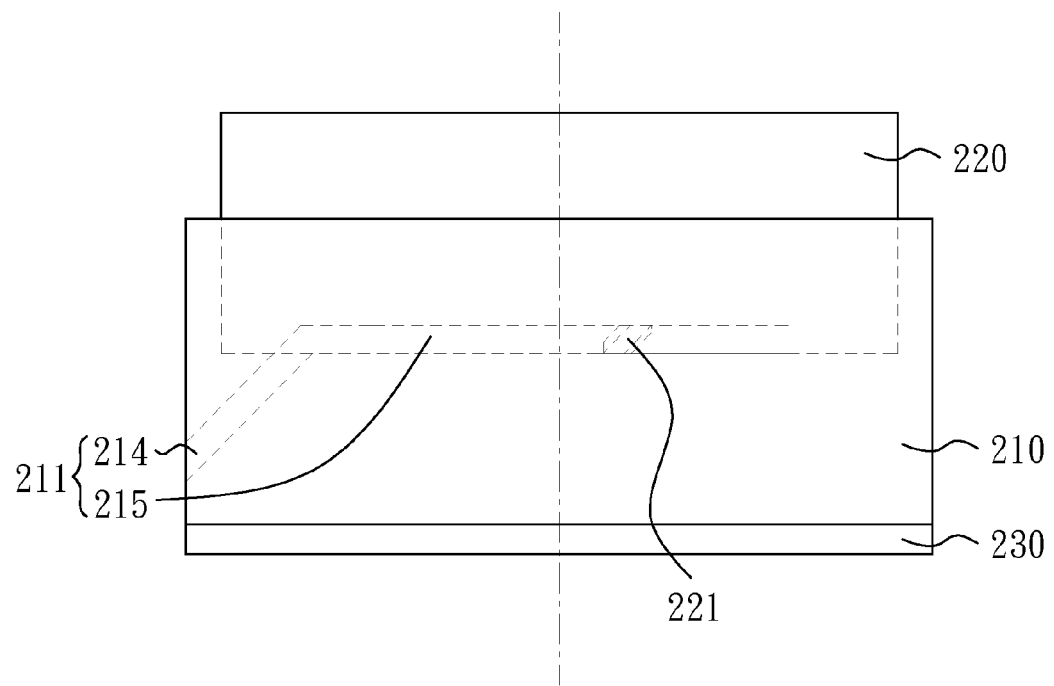
FIG. 1D shows the rotatable lens barrel at the extending position.

FIG. 1C shows the rotatable lens barrel 220 at the enclosing position; FIG. 1D shows the rotatable lens barrel 220 at the extending position. Referring to FIG. 1A, FIG. 1C, and FIG. 1D, when the rotatable lens barrel 220 rotates, the cam follower 221 moves along the cam groove 211 between the extending position and the enclosing position. In this embodiment, the earn groove 211 includes a first lateral groove 213, a tilted groove 214, and a second lateral groove 215. Both ends of the tilted groove 214 are connected with the first lateral groove 213 and the second lateral groove 215 respectively. The cam follower 221 moves along tilted groove 214 toward the extending position or the enclosing position. While the cam follower 221 moves near the end position of the enclosing process, the cam follower 221 moves to the first lateral groove 213 of the cam groove 211 for keeping the rotatable lens barrel 220 at the enclosing position. As shown in FIG. 1D, while the cam follower 221 moves near the end position of the extending process, the cam follower 221 moves to the second lateral groove 215 of the cam groove 211 for keeping the rotatable lens barrel 220 at the extending position. In other words, while the cam follower 221 moves to the second lateral groove 215 of the cam groove 211, the lens device 200 is at the extending position. While the cam follower 221 moves to the first lateral groove 213 of the cam groove 211, the lens device 200 is at the enclosing position.

Figure 2:
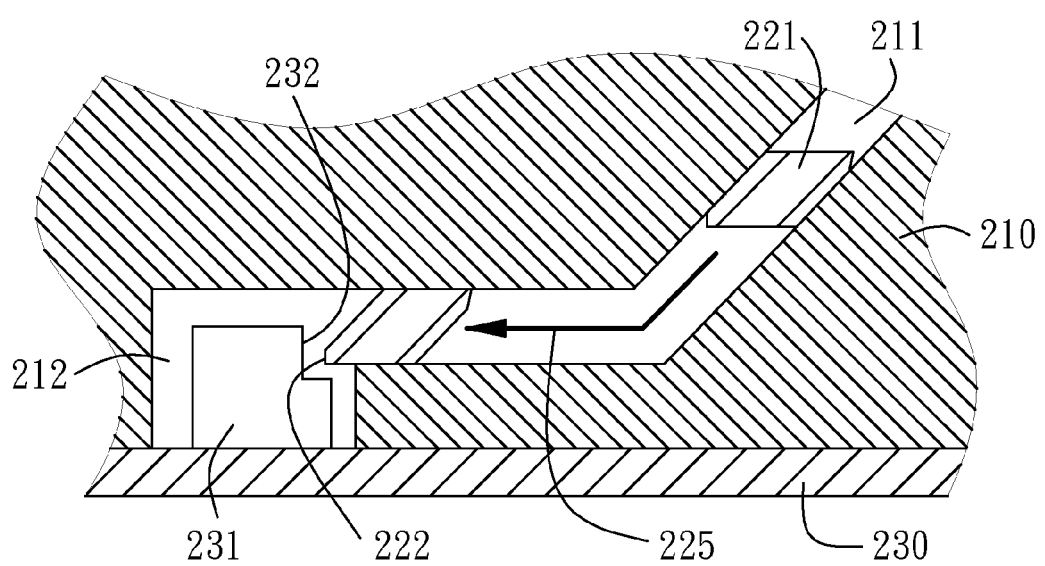
FIG. 2 shows the operation method of the cam follower shown in FIG. 1A.

FIG. 2 shows the operation method of the cam follower 221 shown in FIG. 1A. While the lens device 200 is performing the enclosing process, the cam follower 221 of the rotatable lens barrel 220 moves along moving direction 225 within the cam groove 211. When the rotatable lens barrel 220 reaches the end position of the enclosing process, the cam follower 221 of the rotatable lens barrel 220 is capable of contacting the protruding structure 231 of the base 230 so as to limit the enclosing position of the rotatable lens barrel 220. Thus, the rotatable lens barrel 220 will not rotate excessively, and the rotatable lens barrel 220 will not be jammed at the end position of the enclosing process.

As shown in FIG. 2, in this embodiment, the cam follower 221 has a shape which is corresponding to the cam groove 211. Thus, the earn follower 221 is capable of sliding within the cam groove 211 between the extending position and the enclosing position, and the cam follower 221 will not escape from the cam groove 211. Moreover, the rotatable lens barrel 220 and the cam follower 221 can be formed integrally. Specifically speaking, the rotatable lens barrel 220 and the cam follower 221 can be made of plastic material by the injection process, but is not limited to this. The cam follower 221 can be inlaid on the rotatable lens barrel 220 after the forming process of the rotatable lens barrel 220 by an adhesion process or a riveting process.

Besides, as shown in FIG. 2, while the cam follower 221 moves along the moving direction 225 within the cam groove 211, the outer wall of the cam follower 221 contacts the wall of the cam groove 211 directly. The contact between the cam follower 221 and the cam groove 211 is a plane contact. Thus, the contact pressure between the cam follower 221 and the cam groove 211 is smaller. By the design mentioned above, there is enough contact area between the cam follower 221 and the cam groove 211. Therefore, the cam follower 221 will not be damaged or wear out by the reason of the lower structure strength of the cam follower 221 or the high contact pressure between the cam follower 221 and the cam groove 211.

Moreover, as shown in FIG. 2, according to this embodiment, the cam follower 221 includes a first contacting plane 222; the protruding structure 231 includes a second contacting plane 232. While reaching the end position, of the enclosing process, the cam follower 221 and the protruding structure 231 are contacted to each other by the first contacting plane 222 and the second contacting plane 232. Because the contact between the cam follower 221 and the protruding structure 231 is a plane contact, the cam follower 221 will not be damaged or wear out by high impact force.

Figure 3:
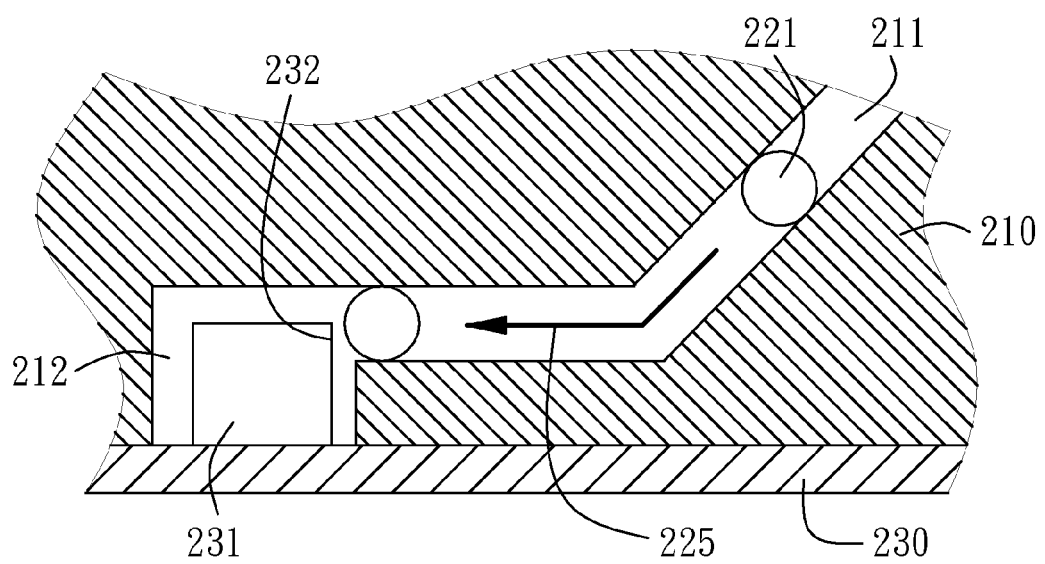
FIG. 3 shows the operation method of the cam follower in accordance with another embodiment of the present invention.

FIG. 3 shows the operation method of the cam follower 221 in accordance with another embodiment of the present invention. In this embodiment, the cam follower 221 has a round column shape. While the cam follower 221 moves along the moving direction 225 within, the cam groove 211, the column surface of the cam follower 221 contacts the wall of the cam groove 211 directly. The contact between the cam follower 221 and the cam groove 211 is a line contact. Besides, while the column surface of the cam follower 221 contacts the protruding structure 231, the contact between the cam follower 221 and the protruding structure 231 is also a line contact.

Specifically speaking, as shown in FIG. 3, the cam follower 221 can be a metal round column or a metal pin which can be inlaid on the rotatable lens barrel 220 by an inlay process, an adhesion process, or a riveting process. Although the contact between the cam follower 221 and the cam groove 211 is a line contact, the contact between the cam follower 221 and the protruding structure 231 is also a line contact. However, the metal round column or the metal pin has higher structure strength and anti-wear properties. The cam follower 221 will not be damaged or wear out because of lower structure strength. In this embodiment, the cam follower 221 is a round column which is made of metal material, but is not limited to this. The cam follower 221 can be made of plastic material by the injection process. In this condition, the structure strength of the cam follower 221 should be well-considered for preventing the cam follower 221 from being damaged or wear out by impact force.

By the design mentioned above, the cam follower 221 of the rotatable lens barrel 220 is capable of contacting the protruding structure 231 of the base 230 for limiting the enclosing position of the rotatable lens barrel 220. There is no need to dispose additional mechanical stop. Thus, the lens device 200 of the present invention has advantages. For example, the structure of the lens device 200 is simpler. The lens device 200 has fewer components. The lens device 200 is easy to assemble. And the lens device 200 has lower cost. Moreover, the digital camera system having the lens device 200 can meet consumer needs for the digital camera system.

Although specific embodiments have been illustrated and described, it will be appreciated by those skilled in the art that various modifications may be made without departing from the scope of the present invention, which is intended to be limited solely by the appended claims.

What is claimed is:
1. A lens device, comprising:
   a fixed lens barrel having at least one cam groove, said cam groove having an opening portion;

a rotatable lens barrel being sleeved within said fixed lens barrel, said rotatable lens barrel having at least one cam follower, said cam follower entering said cam groove through said opening portion and moving along said cam groove; and a base being assembled to said fixed lens barrel, said base having at least one protruding structure, said protruding structure extending to said cam groove through said opening portion.

2. The lens device according to claim 1, wherein said cam follower of said rotatable lens barrel is used to contact said protruding structure so as to limit the retracted position of said rotatable lens barrel.

3. The lens device according to claim 1, wherein said cam follower comprises a first contacting plane, said protruding structure comprises a second contacting plane, said cam follower and said protruding structure are contacted to each other by said first contacting plane and said second contacting plane.

4. The lens device according to claim 1, wherein said rotatable lens barrel and said cam follower are formed integrally, and said cam follower is a round column.

5. The lens device according to claim 1, wherein the contact between said cam follower and said cam groove is a plane contact or a line contact.

6. A lens device, comprising:
a fixed lens barrel having at least one cam groove;
a rotatable lens barrel being sleeved within said fixed lens barrel, said rotatable lens barrel having at least one cam follower, said cam follower moving along said cam groove; and
a base being assembled to said fixed lens barrel, said base having at least one protruding structure, wherein said cam follower of said rotatable lens barrel is used to contact said protruding structure so as to limit the retracted position of said rotatable lens barrel.

7. The lens device according to claim 6, wherein the contact between said cam follower and said protruding structure is a plane contact.

8. The lens device according to claim 6, wherein said cam follower comprises a first contacting plane, said protruding structure comprises a second contacting plane, said cam follower and said protruding structure are contacted to each other by said first contacting plane and said second contacting plane.

9. The lens device according to claim 6, wherein the contact between said cam follower and said cam groove is a plane contact or a line contact.

10. The lens device according to claim 6, wherein said rotatable lens barrel and said cam follower are formed integrally.

11. The lens device according to claim 6, wherein said cam follower is a round column.

12. A digital camera system comprising the lens device claimed in claim 6.

13. A lens device, comprising:
a fixed lens barrel;
a base being assembled to said fixed lens barrel, said base having at least one protruding structure; and
a rotatable lens barrel being sleeved within said fixed lens barrel, said rotatable lens barrel having at least one cam follower, said cam follower of said rotatable lens barrel is used to contact said protruding structure of said base so as to limit the retracted position of said rotatable lens barrel.

14. The lens device according to claim 13, wherein said fixed lens barrel comprises at least one cam groove, said cam follower moves along said cam groove.

15. The lens device according to claim 14, wherein the contact between said cam follower and said cam groove is a plane contact or a line contact.

16. The lens device according to claim 13, wherein the contact between said cam follower and said protruding structure is a plane contact so as to limit the retracted position of said rotatable lens barrel.

17. The lens device according to claim 13, wherein said cam follower comprises a first contacting plane, said protruding structure comprises a second contacting plane, said cam follower and said protruding structure are contacted to each other by said first contacting plane and said second contacting plane.

18. The lens device according to claim 13, wherein said rotatable lens barrel and said cam follower are formed integrally.

19. The lens device according to claim 13, wherein said cam follower is a round column.

20. A digital camera system comprising the lens device claimed in claim 13.

* * * * *